US011686361B2

(12) United States Patent
Gilmore et al.

(10) Patent No.: US 11,686,361 B2
(45) Date of Patent: Jun. 27, 2023

(54) VIBRATION ISOLATOR WITH ZERO POISSON'S RATIO OUTER TUBE

(71) Applicant: Toyota Motor Engineering & Manufacturing North America, Inc., Plano, TX (US)

(72) Inventors: Paul A. Gilmore, Ann Arbor, MI (US); Umesh Gandhi, Farmington Hills, MI (US); Ryohei Tsuruta, Ann Arbor, MI (US); Brian J. Pinkelman, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 277 days.

(21) Appl. No.: 17/094,574

(22) Filed: Nov. 10, 2020

(65) Prior Publication Data

US 2022/0145957 A1    May 12, 2022

(51) Int. Cl.
*F16F 3/00* (2006.01)
*F16F 3/02* (2006.01)
*B60N 2/54* (2006.01)

(52) U.S. Cl.
CPC ............... *F16F 3/026* (2013.01); *B60N 2/54* (2013.01); *F16F 2228/10* (2013.01); *F16F 2232/08* (2013.01); *F16F 2234/02* (2013.01)

(58) Field of Classification Search
None
See application file for complete search history.

(56) References Cited

U.S. PATENT DOCUMENTS

| | | | | |
|---|---|---|---|---|
| 3,507,486 A | * | 4/1970 | Schwaller | F04B 39/1053 267/168 |
| 4,148,469 A | * | 4/1979 | Geyer | F16F 1/122 267/179 |
| 4,186,914 A | * | 2/1980 | Radwill | B60G 11/14 267/168 |
| 4,396,220 A | | 8/1983 | Dieckmann | |
| 4,779,852 A | | 10/1988 | Wassell | |
| 5,224,689 A | * | 7/1993 | Georgiev | B60G 11/14 267/225 |
| 5,482,261 A | * | 1/1996 | Ortega | F16F 3/06 267/168 |
| 5,709,514 A | | 1/1998 | Suggs | |
| 6,443,527 B1 | | 9/2002 | Borcherds | |

(Continued)

FOREIGN PATENT DOCUMENTS

| | | |
|---|---|---|
| CN | 202811955 U | 3/2013 |
| CN | 103671671 A | 3/2014 |

(Continued)

*Primary Examiner* — Steven M Marsh
(74) *Attorney, Agent, or Firm* — Haynes and Boone, LLP

(57) ABSTRACT

Systems and methods for limiting transmission of vibrations and forces causing vibrations from one element to another are provided. A vibration isolator may include a compressible inner member and an outer member compressible with the inner member. The outer member may be positioned at least partially around the inner member to provide lateral support to the inner member. The outer member may maintain a consistent diameter and compression force when in a compressed state. The outer member may include a tube with a zero or near-zero Poisson's ratio.

20 Claims, 7 Drawing Sheets

(56) References Cited

U.S. PATENT DOCUMENTS

| | | | |
|---|---|---|---|
| 8,905,386 B2* | 12/2014 | Rasbach | B60G 9/00 267/168 |
| 9,791,014 B1* | 10/2017 | McKnight | F16F 3/026 |
| 10,371,229 B2 | 8/2019 | Gandhi | |
| 10,677,310 B2 | 6/2020 | Gandhi | |
| 2012/0018962 A1* | 1/2012 | Ac | F16F 3/04 267/136 |
| 2014/0265468 A1 | 9/2014 | Greenhill | |
| 2018/0312086 A1* | 11/2018 | Meingast | B60N 2/7017 |
| 2019/0186589 A1 | 6/2019 | Gandhi | |
| 2021/0301900 A1* | 9/2021 | Zhou | F16F 15/022 |

FOREIGN PATENT DOCUMENTS

| | | |
|---|---|---|
| WO | 2014189792 A1 | 11/2014 |
| WO | 2018055516 A1 | 3/2018 |

\* cited by examiner

VIBRATION ISOLATOR WITH ZERO POISSON'S RATIO OUTER TUBE

TECHNICAL FIELD

The present disclosure relates generally to systems and mechanisms for limiting transmission of vibrations and forces causing vibrations from one element to another, and, more particularly, to a vibration isolator with a zero Poisson's ratio outer tube.

BACKGROUND

Vibrations experienced by a vehicle traveling along a road surface can be irritating to vehicle occupants. For example, forces resulting from such vibrations may be transmitted from the vehicle chassis to the seat(s) where the occupants are sitting. It can be difficult to isolate the seats from these vibrations, with current methods and system often being complex and expensive. Some isolator systems include an inner member and outer member. The outer member may deform laterally, such as into the inner member, during operation, which may cause undesirable binding of the inner member and/or the outer member and other tolerance issues.

Therefore, a need exists in the art for systems and methods that addresses the above deficiencies, or at least offers an improvement, in the art. For example, a need exists for a vibration isolator with a zero Poisson's ratio outer tube.

BRIEF SUMMARY

The present disclosure provides systems and methods for limiting transmission of vibrations and forces causing vibrations from one element to another. Various embodiments of the present disclosure include a vibration isolator having a compressible inner member and an outer member compressible with the inner member. The outer member may be positioned at least partially around the inner member to provide lateral support to the inner member, such as laterally supporting one or more spring members of the inner member. The outer member may maintain a consistent diameter and compression force when in a compressed state. For example, the outer member may include a tube with a zero or near-zero Poisson's ratio. The outer member (e.g., tube) may include a quasi-zero stiffness characteristic when in a compressed state.

Various embodiments of the present disclosure include a vibration isolator including a first compressible member and a second compressible member. The first compressible member may have a first quasi-zero stiffness characteristic over a first displacement range. The second compressible member may have a second quasi-zero stiffness characteristic over a second displacement range. The second displacement range may overlap at least partially with the first displacement range.

Various embodiments of the present disclosure include a method of limiting vibration or shock loads imparted to an object. The method may include positioning a quasi-zero stiffness vibration isolator between a first element and a second element. The vibration isolator may include a compressible first member and a second member compressible with the first member. The second member may include a lattice structure positioned around the first member to provide lateral support to the first member. The lattice structure may provide a quasi-zero stiffness characteristic.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures.

DETAILED DESCRIPTION

The present disclosure provides systems and methods for limiting transmission of vibrations and forces causing vibrations from one element to another. A vibration isolator may include a compressible first, inner member and a second, outer member compressible with the first member. The second member may be positioned at least partially around the first member to provide lateral support to the first member, such as laterally supporting one or more spring elements of the first member. The second member may maintain a consistent diameter and compression force when in a compressed state. For example, the second member may include a tube with a zero or near-zero Poisson's ratio. The second member (e.g., tube) may include a quasi-zero stiffness characteristic when in a compressed state. The first member may have a first quasi-zero stiffness characteristic over a first displacement range. The second member may have a second quasi-zero stiffness characteristic over a second displacement range. The second displacement range may overlap at least partially with the first displacement range.

The vibration isolator may be positioned, at least partially, between a first element and a second element to attenuate transmission of vibrations and/or forces causing vibrations from the first element to the second element, or vice versa. The vibration isolator may be secured to the first element, such as via a first flange of the second member. The vibration isolator may be secured to the second element, such as via a second flange of the second member. The first member may abut or otherwise be secured to the first element and the second element. The first element may be a vehicle frame or chassis component. The second element may be a vehicle seat.

Figure 1:
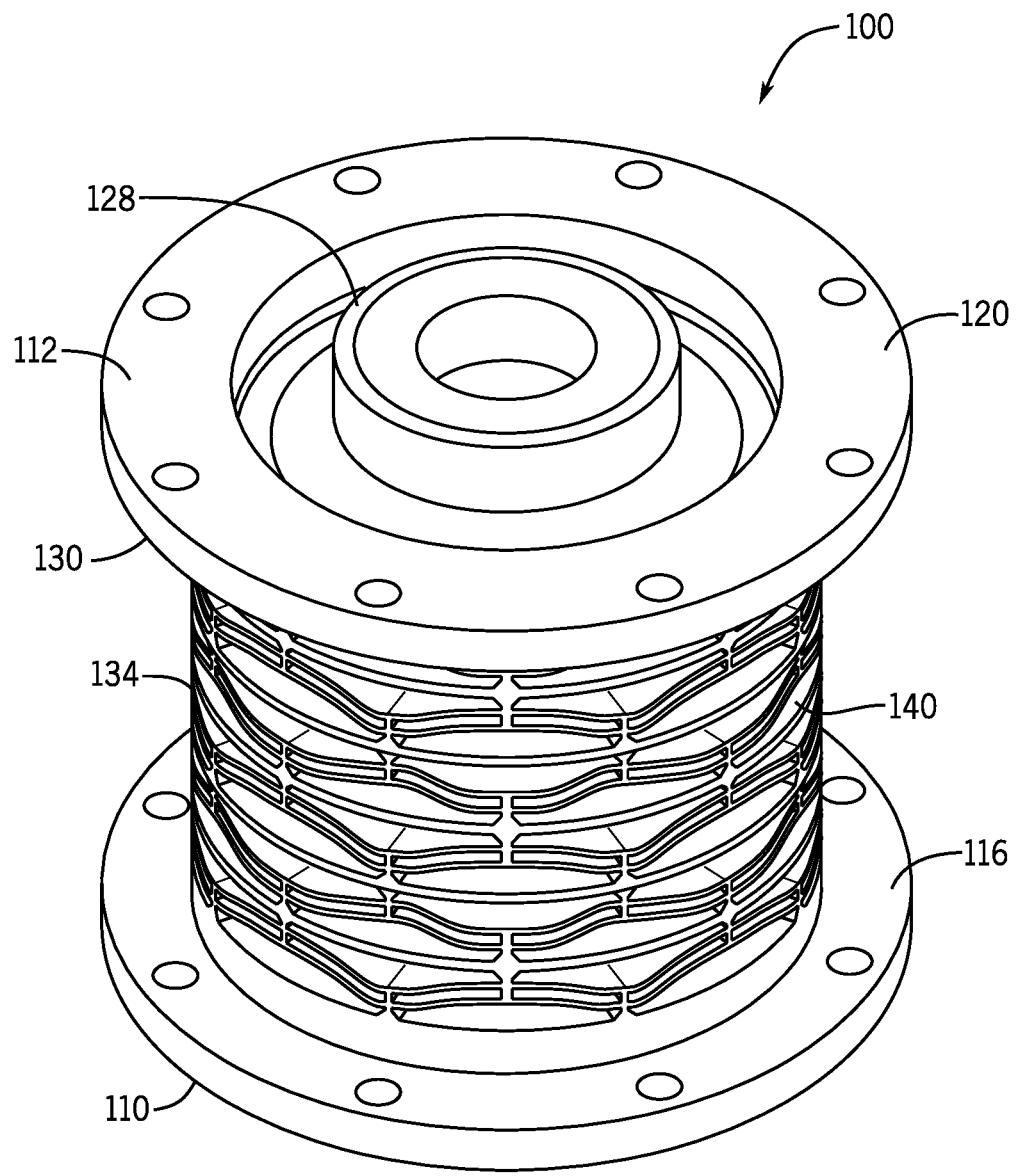
FIG. 1 is an illustration of a vibration isolator, according to one or more embodiments of the disclosure.
Figure 2:
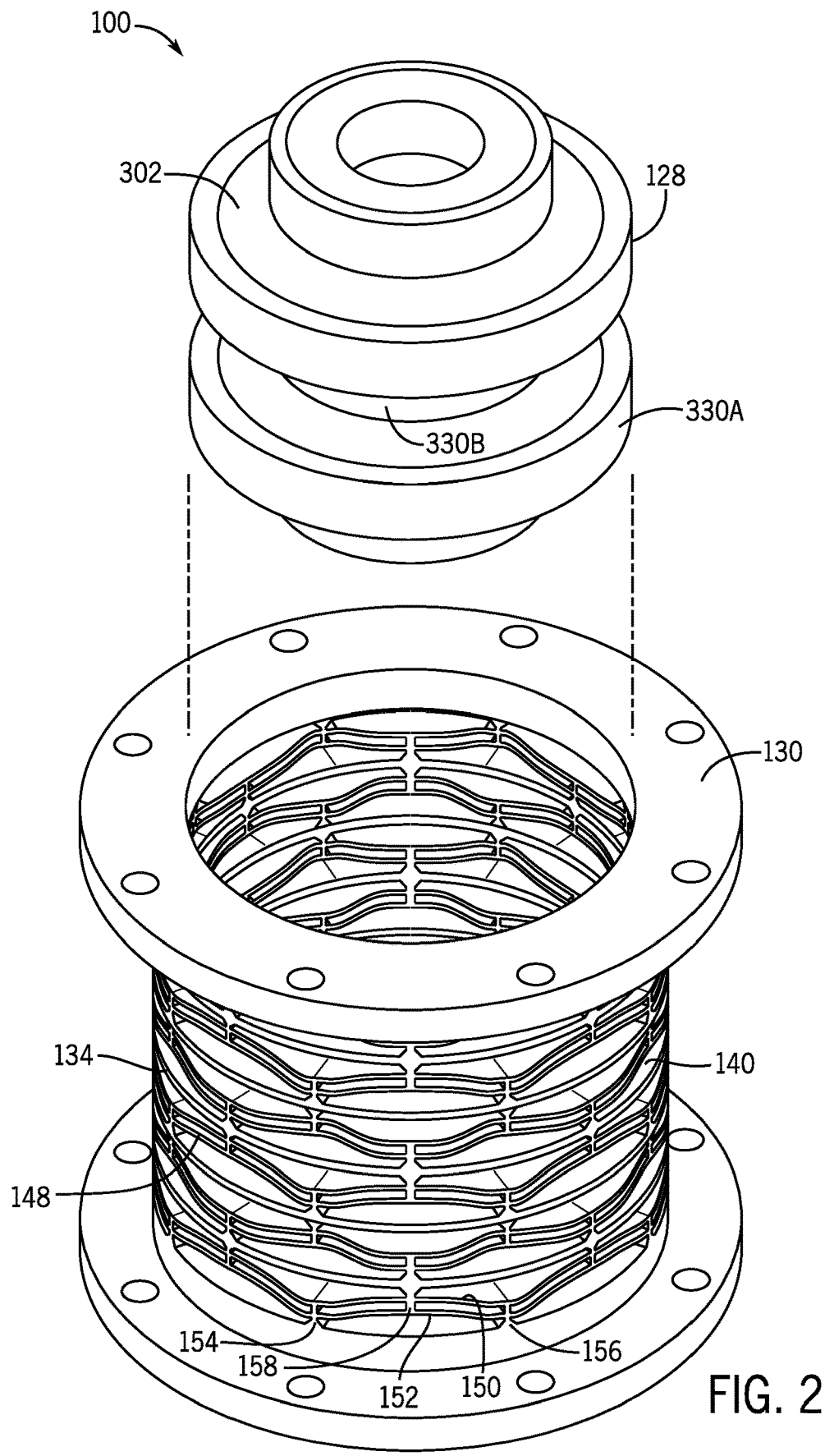
FIG. 2 is an exploded view of the vibration isolator, according to one or more embodiments of the disclosure.

FIG. 1 is an illustration of a vibration isolator 100, according to one or more embodiments of the disclosure. FIG. 2 is an exploded view of the vibration isolator 100, according to one or more embodiments of the disclosure. As described herein, the vibration isolator 100 may be structured and positioned for limiting transfer of vibrations from a first element 102 to a second element 104 (see FIG. 3, for example). For example, the vibration isolator 100 may be disposed between elements of a system or mechanism to vibrationally isolate the elements from each other. As a result, transmission of vibrations experienced by a first element of the system or mechanism to a second element of the system or mechanism may be attenuated, limited, or eliminated by the vibration isolator 100.

In embodiments, the vibration isolator 100 may be incorporated into a vehicle to isolate, at least partially, a vehicle seat assembly from vibrations experienced by a vehicle chassis during movement of the vehicle along a road surface. Such embodiments are illustrative only, and the vibration isolator 100 structure described herein may be adapted to other applications to isolate or insulate many types of mechanisms or elements from vibrations experienced by mounts or structures to which the mechanisms or elements are attached or secured. Other vehicle applications may include mounts to vibrationally isolate motors, transmissions, or electronics, among other vehicle elements. Non-vehicle applications may include equipment mounting systems, such as in manufacturing plants.

Referring to FIG. 1, the vibration isolator 100 may include a first end 110 and an opposing second end 112, each configured or adapted to be secured to respective elements. For example, the first end 110 may include a flange 116 through which one or multiple fasteners are received to secure the vibration isolator 100 to the first element 102, as described below. The second end 112 may also include structure, such as a similar or a different structure, allowing the second end 112 to be secured to the second element 104. For example, the second end 112 may include a second flange 120 through which one or multiple fasteners are received to secure the vibration isolator 100 to the second element 104, although other configurations are contemplated. When secured to the first element 102 and the second element 104, the vibration isolator 100 may limit transfer of vibrations from the first element 102 to the second element 104, or vice versa.

Referring to FIG. 2, the vibration isolator 100 includes a first member 128 and a second member 130. The first member 128 may be compressible to attenuate transmission of vibrations from the first element 102 to the second element 104, or vice versa. For example, the first member 128, which may be referred to as an inner member, a compressible inner member, a first compressible member, a compressible first member, or the like, may include or define an energy-absorbing structure that absorbs shock or vibration loads between the first element 102 and the second element 104. Depending on the application, the first member 128 may include one or multiple elements, such as a plurality of elements stacked together to provide an energy-absorbing characteristic. In embodiments, the first member 128 may be similar to the vibration isolator 100 disclosed in U.S. Pat. No. 10,371,229 B2 entitled "VIBRATION ISOLATOR MECHANISM WITH ADJUSTABLE FORCE-DEFLECTION CHARACTERISTICS" and/or U.S. Patent Application Publication No. 2019/0186589 A1 entitled "VIBRATION ISOLATOR WITH SERIES AND/OR PARALLEL CONICAL DISC SPRING MEMBER ARRANGEMENTS," the disclosures of which are hereby incorporated by reference in their entireties.

The second member 130 may be compressible with the first member 128 to further attenuate transmission of vibrations between the first element 102 and the second element 104. In embodiments, the second member 130 may include or define an energy-absorbing structure that absorbs shock or vibration loads between the first element 102 and the second element 104. As shown, the second member 130 may be a hollow or partially hollow member including a tube 134 extending between the first end 110 and the second end 112 of the vibration isolator 100, such as between the flange 116 and the second flange 120 of the vibration isolator 100. In such embodiments, the first member 128 may be positioned within the tube 134 of second element 104. For instance, the second member 130 may be positioned at least partially around the first member 128 to hold or otherwise secure the first member 128. For example, the tube 134 may wrap around the first member 128 to limit lateral shifting or displacement of the first member 128. Accordingly, the tube 134 may be referred to as an outer sleeve that is positioned around the first member 128. The second member 130 may be referred to as an outer member, a compressible outer member, a second compressible member, a compressible second member, or the like.

The tube 134 may form an energy-absorbing structure incorporated into the second member 130. For example, the tube 134 may be defined at least partially be a lattice structure 140. The lattice structure 140 may include many configurations structured to absorb energy (e.g., shocks or vibrations). For example, the lattice structure 140 may be structured to allow the tube 134 to repeatedly compress and expand along the long axis of the tube 134 to absorb energy (e.g., vibrations and forces causing vibrations, etc.). As a result, the tube 134 may compress with the first member 128 to provide an energy-absorbing or a vibration-attenuating characteristic.

As shown, the lattice structure 140 may include a pattern of repeating double-beam structures 148, although other configurations are contemplated. Each double-beam structure 148 may include a first beam 150 and a second beam 152 extending parallel or generally parallel to the first beam 150 between opposing first and second posts 154, 156. A third post 158 may connect the first beam 150 to the second beam 152 midway or substantially midway between the first post 154 and the second post 156. The first post 154, second post 156, and third post 158 may extend parallel or generally parallel to one another. The third post 158 may move with the first beam 150 and the second beam 152 and parallel or generally parallel to the long axis of the tube 134 to absorb energy or vibration.

Each double-beam structure 148 may be bi-stable. For instance, each double-beam structure 148 may have two stable states, the double-beam structure 148 designed to rest in one of the two stable states, but not between the states. The stable states may be defined by the potential energy of the double-beam structure 148 having two local minima, which are the stable equilibrium points. In embodiments, the double-beam structure 148 may include an over center design, with a peak between the two stable states. Forces may be applied to the double-beam structure 148 to move it just past the peak, at which point the double-beam structure 148 may move (e.g., automatically, such as snapping) to its secondary stable position. In embodiments, the lattice structure 140 may be configured to prevent or limit the double-beam structure 148 from snapping into its secondary stable position. For example, the lattice structure 140 may include a ring or other structure preventing or limiting the double-beam structure 148 from exceeding a threshold sufficient to move the double-beam structure 148 to its secondary stable position.

The bi-stable characteristic of the double-beam structures 148 may be defined by the physical constraints of the system. For example, the distance between the first post 154 and the second post 156 may be less than the lengths of the first beam 150 and the second beam 152. The first beam 150 and the second beam 152 may also be resiliently deformable, such that movement of the third post 158 parallel to the long axis of the tube 134 will "snap" the double-beam structure 148 into one of two stable configurations. The double-beam structure 148 may undergo elastic buckling rather than plastic deformation, allowing the double-beam structure 148 to recover from deformations, such as fully recovering from repeated and/or large deformations.

The lattice structure 140 may include any number of repeating double-beam structures 148 creating a circular or cylindrical geometry. For example, the lattice structure 140 may include an integer number of unit cells around the circumference of the tube 134. The circumference of the tube 134 may be equal to the arc length of one unit cell times an integer (1, 2, 3, etc.). In some embodiments, the lattice structure 140 may include eight unit cells around the circumference of the tube 134, although other configurations are contemplated depending on the circumference of the tube 134 and the length of each double-beam structure 148.

The lattice structure 140 may include any number of unit cell layers stacked along the length of the tube 134 (e.g., in the vertical direction). For example, the lattice structure 140 may include six layers of double-beam structures 148, although other configurations are contemplated depending on the length of the tube 134. In embodiments, the lattice structure 140 may include the same number of unit cell layers as the number of spring members in the first member 128 (e.g., the same number of unit cell layers as the number of conical disk springs). The unit cell layers may be buckled in succession as the tube 134 is compressed. Depending on the application, the unit cell layers may buckle from one end of the tube 134 to the other (e.g., from the first end 110 to the second end 112, from the second end 112 to the first end 110, etc.), in a pattern amongst the available layers (e.g., first layer, fourth layer, second layer, fifth layer, third layer, sixth layer, in order, among other patterns), or randomly amongst the available layers. As a result, the compressible regions of the first member 128 and the second member 130 may be equal or approximately equal in length.

Figure 3:
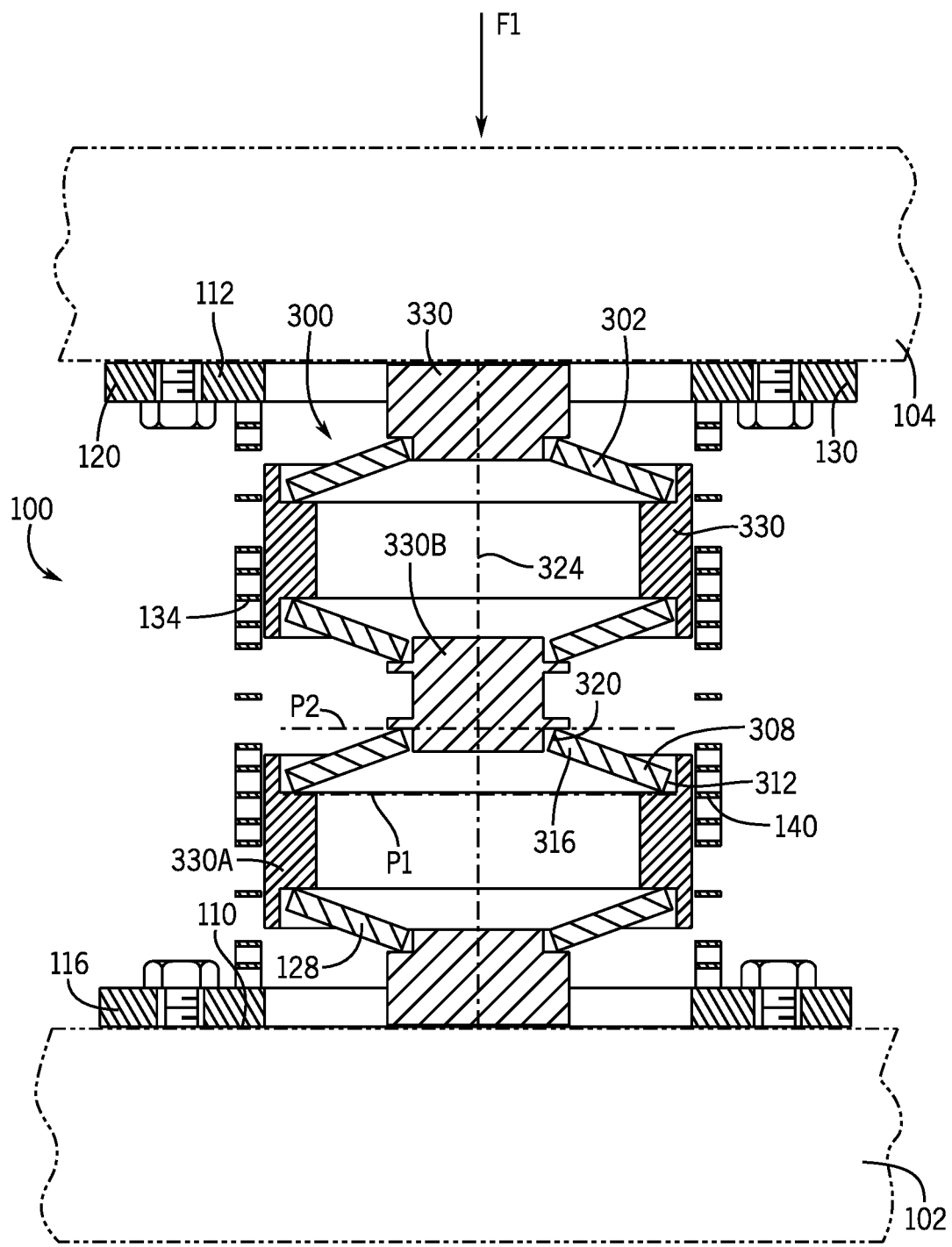
FIG. 3 is a schematic cross-sectional view of the vibration isolator in a first configuration, according to one or more embodiments of the disclosure.
Figure 4:
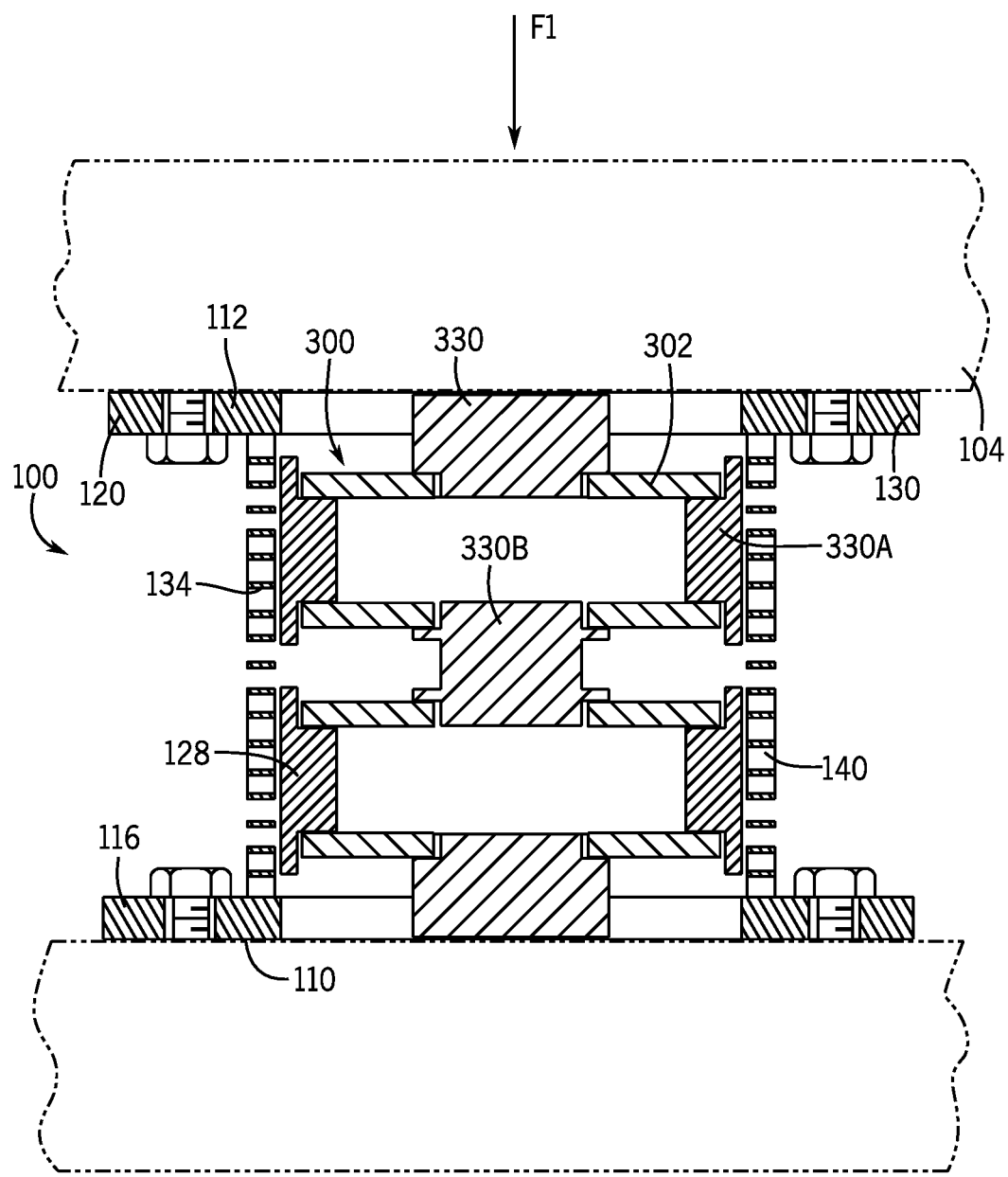
FIG. 4 is a schematic cross-sectional view of the vibration isolator in a second configuration, according to one or more embodiments of the disclosure.
Figure 5:
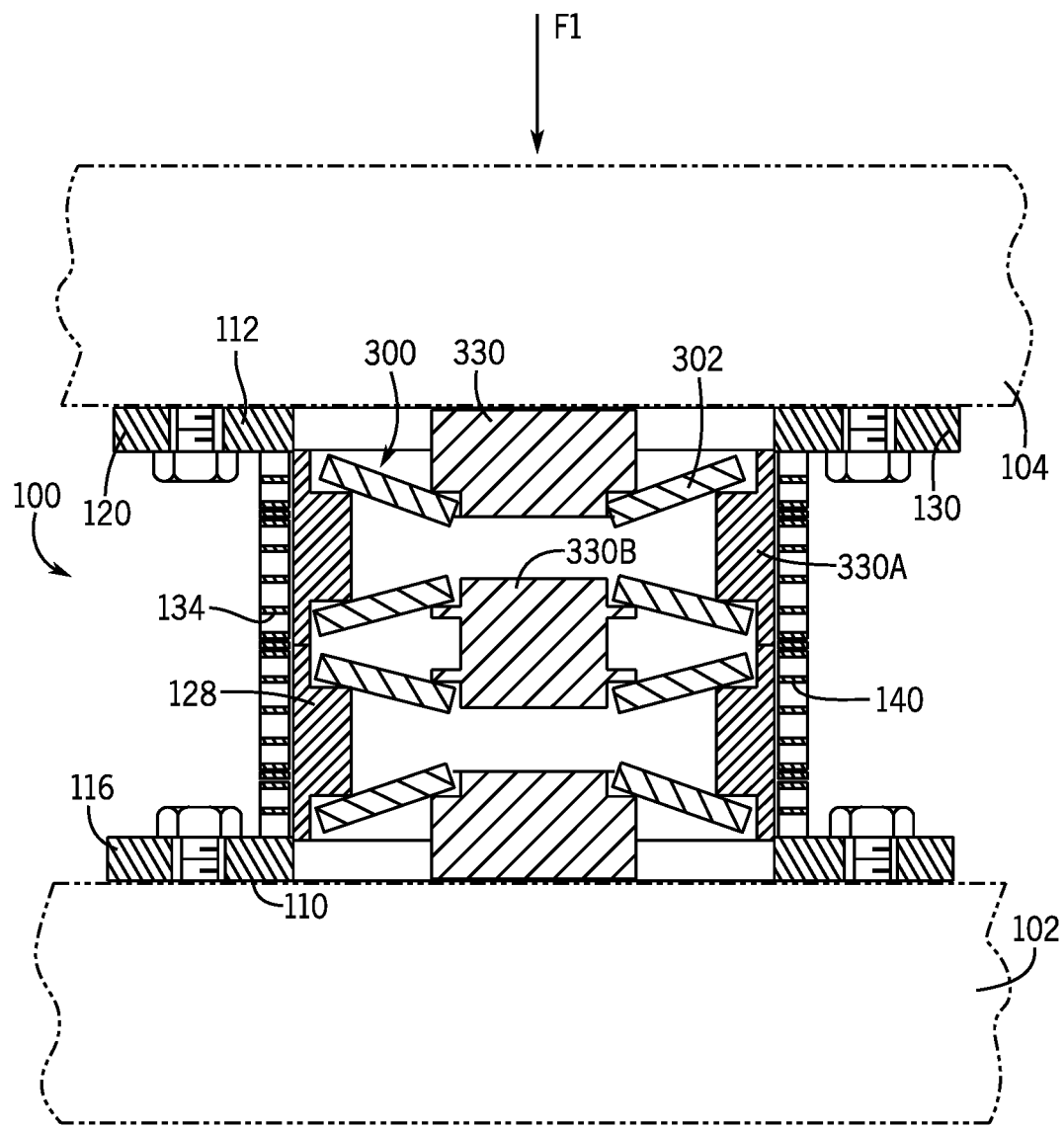
FIG. 5 is a schematic cross-sectional view of the vibration isolator in a third configuration, according to one or more embodiments of the disclosure.

FIG. 3 is a schematic cross-sectional view of the vibration isolator 100 in a first configuration, according to one or more embodiments of the disclosure. FIG. 4 is a schematic cross-sectional view of the vibration isolator 100 in a second configuration, according to one or more embodiments of the disclosure. FIG. 5 is a schematic cross-sectional view of the vibration isolator 100 in a third configuration, according to one or more embodiments of the disclosure. Referring to FIGS. 3-5, the first member 128 may include or be defined by a spring assembly 300 extending between the first end 110 and the second end 112 of the vibration isolator 100. In embodiments, the first member 128 may include at least one conical disk spring 302. In embodiments, the first member 128 may include a plurality of conical disk springs 302, such as a series of stacked conical disk springs 302. As shown, the conical disk springs 302 may be stacked in an alternating configuration. The conical disk springs 302 may have the same shape and dimensions, or the conical disk springs 302 may have different shapes and dimensions.

As shown, each conical disk spring 302 is in the shape of a truncated, right circular cone. Each conical disk spring 302 includes a first end 308 defining a circular base of the conical structure and including an outer edge 312. Each conical disk spring 302 may include a second end 316 opposite the first end 308 and including an opening defined by an inner edge 320. The first end 308 extends along a first plane P1, and the opening extends along a second plane P2, which truncates the conical structure and is parallel to the first plane P1. A central axis 324 extends through the center of the opening and the center of the first end 308 perpendicular to the first plane P1 and the second plane P2. As shown, the conical disk springs 302 are aligned coaxially along the central axis 324 of each conical disk spring 302.

The conical disk springs 302 may be in the form of Belleville washers or similar structures designed or selected in accordance with the parameters and considerations described herein, such as to provide a desired force-deflection characteristic. The conical disk springs 302 may act as spring members when a load is applied at the first end 308 and/or the second end 316 of the conical disk springs 302, where the applied loading acts to deflect one of the first end 308 or the second end 316 in a direction toward the other of the first end 308 or the second end 316.

With continued reference to FIGS. 3-5, the first member 128 may include a ring spacer 330 positioned between two adjacent conical disk springs 302. In embodiments, a ring spacer 330 may be disposed between each two adjacent conical disk springs 302. Each ring spacer 330 may engage each of the adjacent conical disk springs 302. For example, the first member 128 may include an outer ring spacer 330A positioned to engage the outer edges 312 of adjacent conical disk springs 302. In embodiments, the first member 128 may include an inner ring spacer 330B positioned to engage the inner edges 320 of adjacent conical disk springs 302. The first member 128 may include any number of outer ring spacers 330A and inner ring spacers 330B based on the number of conical disk springs 302. A ring spacer 330 (e.g., an uppermost or lowermost outer ring spacer 330A or inner ring spacer 330B) may engage the first element 102 and/or the second element 104 to transfer vibration or other loads to the conical disk spring(s) 302 of the first member 128.

The second member 130 may be positioned around the first member 128 to provide lateral support to the first member 128. For instance, the first member 128 may be positioned within the tube 134 to laterally support the first member 128, such as to laterally support the ring members, the conical disk springs 302, or the spring assembly 300. Without the tube 134 positioned around the first member 128, the first member 128 may bind or fail, such as from disengagement of the conical disk springs 302 from the ring spacers 330.

With continued reference to FIGS. 3-5, the first end 110 of the vibration isolator 100 may be connected to the first element 102, and the second end 112 of the vibration isolator 100 may be connected to the second element 104. For example, the flange 116 of the second member 130 may be secured to the first element 102 via one or more fasteners. Similarly, the second flange 120 of the second member 130 may be secured to the second element 104 via one or more fasteners. As shown, a first ring spacer (e.g., a first inner ring spacer 330B) of the first member 128 may abut a portion of the first element 102. In like manner, a second ring spacer (e.g., a second inner ring spacer 330B) of the first member 128 may abut a portion of the second element 104. In such embodiments, the first member 128 and the second member 130 attenuate movement of the first element 102 relative to the second element 104. For example, the first member 128 and the second member 130 may limit vibration and other force transfer between the first element 102 and the second element 104.

FIG. 3 illustrates the vibration isolator 100 in a first configuration. The first configuration may be a steady-state or static configuration in which the vibration isolator 100 is not compressed. For example, each of the first member 128 and the second member 130 of the vibration isolator 100 may be in an extended or uncompressed state. As shown, the tube 134 of the second member 130 may be engaged with one or more outer surfaces of the first member 128 to laterally support the first member 128 in the first configuration.

FIG. 4 illustrates the vibration isolator 100 in a second configuration. The second configuration may be a static or dynamic configuration in which the vibration isolator 100 is compressed under a force F1 applied to the vibration isolator 100. The force F1 may be a static force, such as from the weight of a passenger sitting on a vehicle seat attached to the vibration isolator 100, or a dynamic force, such as from vibrations experienced by a vehicle chassis during vehicle movement. As shown, the conical disk springs 302 of the first member 128 may initially deflect to absorb and/or counteract the force F1 applied to the vibration isolator 100. Similarly, the lattice structure 140 may initially deform to absorb the shock or force loads applied to the vibration isolator 100. The tube 134 of the second member 130 may maintain engagement with the one or more outer surfaces of the first member 128 to laterally support the first member 128 in the second configuration. In embodiments, the second member 130 may maintain a consistent diameter between the first configuration and the second configuration. For example, the diameter of tube 134 may be consistent between the first configuration and the second configuration to maintain lateral support of the first member 128 as the tube 134 is compressed. As a result, the tube 134 may have a Poisson's ratio of zero or substantially zero, such that the diameter of the tube 134 does not expand or contract in a direction perpendicular to the direction of compression or expansion of the tube 134 between the first and second configurations.

FIG. 5 illustrates the vibration isolator 100 in a third configuration. The third configuration may be a static or dynamic configuration in which the vibration isolator 100 is compressed further under force F1 applied to the vibration isolator 100. As shown, the conical disk springs 302 of the first member 128 may further deflect, and invert in some embodiments, to further absorb and/or counteract the force F1 applied to the vibration isolator 100. Similarly, the second member 130 (e.g., lattice structure 140) may further deform to absorb the shock or force loads applied to the vibration isolator 100. The tube 134 of the second member 130 may continue to engage the one or more outer surfaces of the first member 128 to laterally support the first member 128 in the third configuration. Referring to FIGS. 1-3, the second member 130 may maintain a consistent diameter across all configurations, such as the diameter of tube 134 being consistent between the first configuration, the second configuration, and the third configuration to maintain lateral support of the first member 128. The tube 134 may compress with the first member 128 to limit relative movement between the first and second members 128, 130. For example, the tube 134 may have a Poisson's ratio of zero or substantially zero, such that the diameter of the tube 134 does not expand or contract in a direction perpendicular to the direction of compression or expansion of the tube 134 between the first, second, and third configurations.

Figure 6:
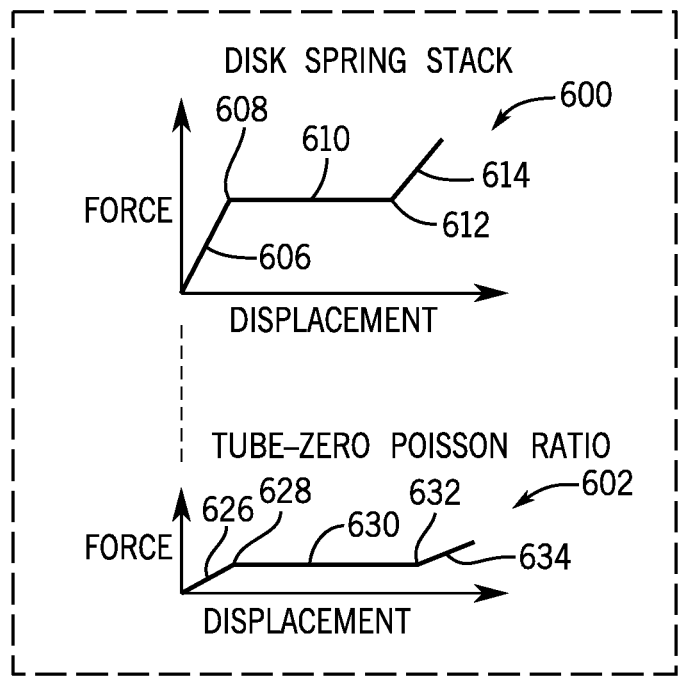
FIG. 6 is a graphical representation of exemplary force-displacement curves for the vibration isolator, according to one or more embodiments of the disclosure.

FIG. 6 is a graphical representation of exemplary force-displacement curves for vibration isolator 100, according to one or more embodiments of the disclosure. A first curve 600 may represent the force-displacement curve of the first member 128. A second curve 602 may represent the force-displacement curve of the second member 130. Referring to FIGS. 3 and 6, when force F1 is applied to the vibration isolator 100, the first member 128 may initially deflect, as indicated by portion 606 of first curve 600, up to a first force 608. At the first force 608, the first member 128 may have a first quasi-zero stiffness characteristic over a first displacement range (a first quasi-zero stiffness region 610), such that the first member 128 experiences increased deflection with no or little additional force. For example, the force to compress the first member 128 may be constant or substantially constant within the first quasi-zero stiffness region 610. In embodiments, the first member 128 may have a high static, low dynamic stiffness. In some embodiments, the first member 128 may have an appreciable static stiffness but very small (e.g., near zero or zero) dynamic stiffness. The first member 128 may maintain a consistent compression force when in a compressed state, and with increased displacement. The first member 128 may have been deflected to conditions similar to that shown in FIG. 4, in which the conical disk springs 302 are flat or nearly flat. As the force F1 continues to increase, or until a maximum displacement of quasi-zero stiffness of the first member 128 is reached, the first quasi-zero stiffness characteristic may end at a second force 612. Depending on the application, the first force 608 may be similar to the second force 612. After the first quasi-zero stiffness region 610 is passed, the first member 128 may continue to deflect, as indicated by portion 614 of first curve 600. The first member 128 may have been deflected to conditions similar to that shown in FIG. 5, in which the conical disk springs 302 resiliently deflect past the flat state until the conical disk springs 302 are inverted (i.e., oriented in directions opposite to their initial configurations shown in FIG. 3).

Referring to FIGS. 3 and 6, when force F1 is applied to the vibration isolator 100, the second member 130 may initially deflect, as indicated by portion 626 of second curve 602, up to a third force 628. At the third force 628, the second member 130 may have a second quasi-zero stiffness characteristic over a second displacement range (a second quasi-zero stiffness region 630), such that the second member 130 experiences increased deflection with no or little additional force. For example, the force to compress the second member 130 may be constant or substantially constant within the second quasi-zero stiffness region 630. In embodiments, the second member 130 may have a high static, low dynamic stiffness. In some embodiments, the second member 130 may have an appreciable static stiffness but very small (e.g., near zero or zero) dynamic stiffness. As a result, the second member 130 may maintain a consistent compression force when in a compressed state, and with increased displacement. As the force F1 continues to increase, or until a maximum displacement of quasi-zero stiffness of the second member 130 is reached, the second quasi-zero stiffness characteristic may end at a fourth force 632. Depending on the application, the third force 628 may be similar to the fourth force 632. After the second quasi-zero stiffness region 630 is passed, the second member 130 may continue to deflect, as indicated by portion 634 of second curve 602.

Referring to FIG. 6, the force-displacement curve of the second member 130 (i.e., the second curve 602) may be similar to the force-displacement curve of the first member 128 (i.e., the first curve 600). For example, the first and second curves 600, 602 may include a similar shape. In embodiments, portions 606 and 626 may be similar, with the start of each portion 606, 626 and the displacement at which quasi-zero stiffness is reached for the first member 128 and the second member 130 being similar for both. In some embodiments, the second member 130 may reach quasi-zero stiffness before the first member 128, although other configurations are contemplated. The first quasi-zero stiffness region 610 and the second quasi-zero stiffness region 630 may be similar, such as the length (displacement) of quasi-zero stiffness for both the first member 128 and the second member 130 being identical or near identical (e.g., within 5-20% of each other). The length (displacement) of quasi-zero stiffness may be longer for the second member 130 than for the first member 128. The displacements of the first member 128 and the second member 130 when the forces are reached at the quasi-zero stiffness level may be within about 0-10% of each other. In embodiments, the first quasi-zero stiffness region 610 of the first member 128 may overlap at least a portion of the second quasi-zero stiffness region 630 of the second member 130. For instance, the first force 608 and the third force 628 may be similar or identical. In embodiments, the first force 608 and the third force 628 may be within about 5% and about 25% of each other. Similarly, the second force 612 and the fourth force 632 may be similar or identical. The second force 612 and the fourth force 632 may be within about 5% and about 25% of each other.

The first member 128 and the second member 130 may combine to absorb the force F1 applied to the vibration isolator 100. One of the first member 128 or the second member 130 may absorb a greater amount of the force F1. For example, a majority (e.g., greater than 50%) or most of the load may be taken by the first member 128, with the second member 130 configured to support the first member 128, although other configurations are contemplated. In embodiments, the force at which quasi-zero stiffness is reached for the first member 128 may be higher than the force at which quasi-zero stiffness is reached for the second member 130. For example, the force at which quasi-zero stiffness is reached for the second member 130 may be small compared to the first member 128. In embodiments, the force at which quasi-zero stiffness is reached for the second member 130 may be about 10-30% of the force at which quasi-zero stiffness is reached for the first member 128.

Figure 7:
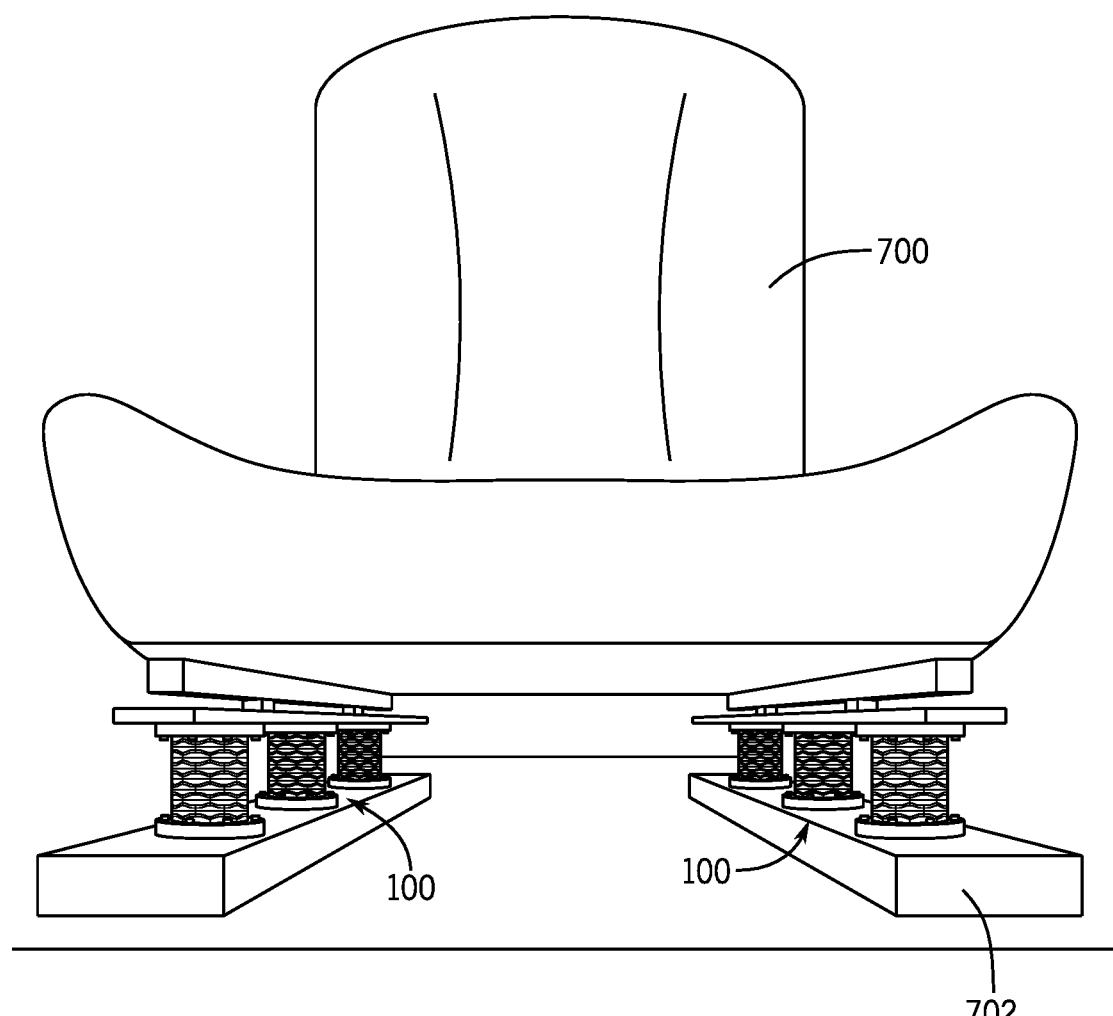
FIG. 7 is a graphical representation of the vibration isolator connected to a vehicle seat, according to one or more embodiments of the disclosure.

FIG. 7 is a graphical representation of the vibration isolator 100 connected to a vehicle seat 700, according to one or more embodiments of the disclosure. The vibration isolator 100 may be disposed between the vehicle seat 700 and a vehicle frame 702. In embodiments, the vibration isolator 100 may be secured to each of the vehicle seat 700 and the vehicle frame 702. For example, the flange 116 may be secured to a frame member, floor, or other chassis component of a vehicle, and the second flange 120 may be secured to the vehicle seat 700, such as to a seat rail, a seat base, or the like. In some embodiments, the vibration isolator 100 may support the vehicle seat 700 from the bottom. In embodiments, a plurality of vibration isolators 100 may support the vehicle seat 700, such as two vibration isolators 100, three vibration isolators 100, four vibration isolators 100, or more than four vibration isolators 100. In some embodiments, a minimum of three vibration isolators 100 may support the vehicle seat 700. The vibration isolator 100 may be incorporated in other manners. For instance, one or multiple vibration isolators 100 may be incorporated into the seat back of the vehicle seat 700 to attenuate vibrations imparted to the seat back, for example.

Although the vibration isolator 100 is shown connecting the vehicle seat 700 to the vehicle frame 702, the vibration isolator 100 may be disposed between any two elements, such as between a base and an object. The vibration isolator 100, or more than one vibration isolators 100, may be positioned between the base and the object to limit vibrations or shock forces imparted to the object from the base. Non-limiting examples include motor mounts, transmission mounts, equipment mounting systems, and the like.

Figure 8:
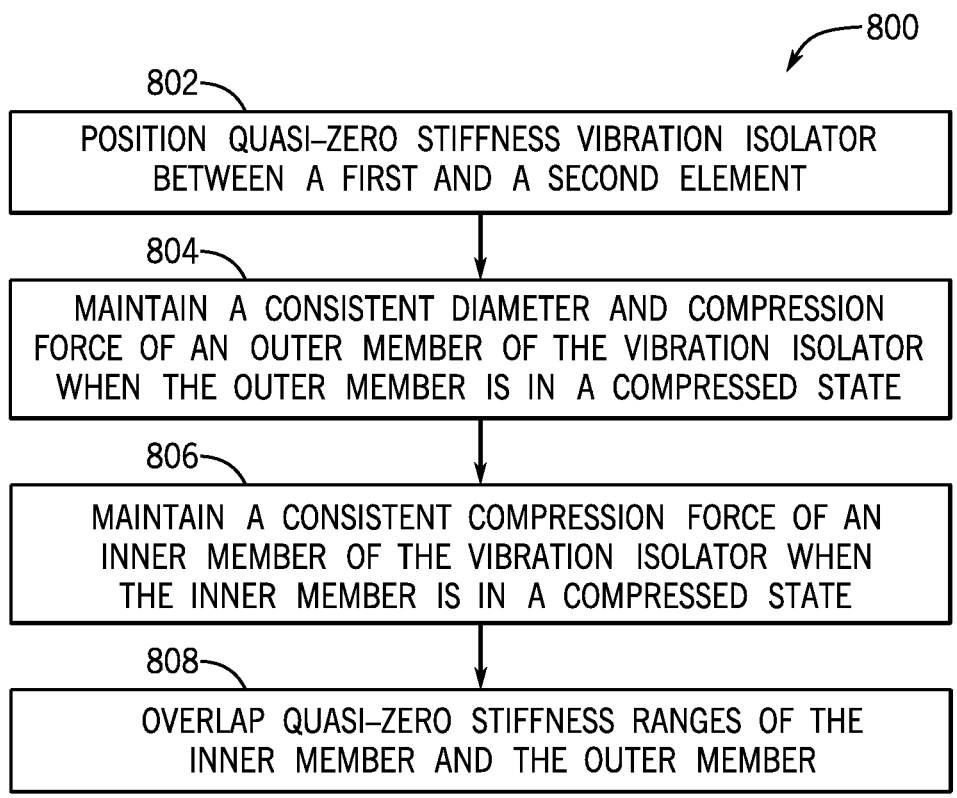
FIG. 8 is a flowchart of a method of limiting transfer of vibrations from a first element to a second element, according to one or more embodiments of the disclosure.

FIG. 8 is a flowchart of a method 800 of limiting vibration or shock loads imparted to an object, such as limiting transfer of vibrations from a first element to a second element, according to one or more embodiments of the disclosure. Method 800 may be implemented using various systems, such as system described above. Method 800 is illustrated as a set of operations or steps and is described with reference to FIGS. 1-7, although method 800 may be applied to other embodiments not illustrated in FIGS. 1-7. One or more steps that are not expressly illustrated in FIG. 8 may be included before, after, in between, or as part of the illustrated steps.

In Block 802, method 800 includes positioning a quasi-zero stiffness vibration isolator between a first element and a second element. The quasi-zero stiffness vibration isolator may be similar to vibration isolator 100 described above. For example, the quasi-zero stiffness vibration isolator may include a compressible first member and a second member compressible with the first member. The first member may include a spring stack, such as a stack of conical disk springs. The second member may include a lattice structure positioned around the first member to provide lateral support to the first member. For instance, the second member may limit binding or other failure of the first member, such as from disengagement of the conical disk springs from their seated positions/configurations.

Block 802 may include securing the quasi-zero stiffness vibration isolator to the first element and the second element. For instance, a first flange of the quasi-zero stiffness vibration isolator may be secured to the first element. A second flange of the quasi-zero stiffness vibration isolator may be secured to the second element. The first flange and/or the second flange may be formed in the second member. The first element may be a vehicle frame, floor, or other chassis component. The second element may be a vehicle seat.

In Block 804, method 800 may include maintaining a consistent diameter and compression force of the second member when the second member is in a compressed state. For example, the second member may include a tube surrounding the first member, the tube including a lattice structure with a zero or near-zero Poisson's ratio, such that the diameter of the tube does not expand or contract in a direction perpendicular to the direction of compression or expansion. As a result, the radial relationship of the tube with the first member may be maintained, such that the tube laterally supports the first member through the range of motion of the quasi-zero stiffness vibration isolator. The lattice structure of the tube may also have a quasi-zero stiffness characteristic over a displacement range of the tube. In such embodiments, the second member may experience increased deflection (e.g., compression) with no or little additional force applied to the second member.

In Block 806, method 800 may include maintaining a consistent compression force of the first member when the first member is in a second compressed state. Similar to second member, the first member may include a quasi-zero stiffness characteristic over a displacement range of the first member. Like the second member, the first member may experience increased deflection (e.g., compression) with no or little additional force applied to the first member.

In Block 808, method 800 may include overlapping the quasi-zero stiffness ranges of the first member and the second member. For example, the first member may include a first quasi-zero stiffness displacement range, and the second member may include a second quasi-zero stiffness displacement range. Block 808 may include overlapping the first quasi-zero stiffness displacement range at least partially with the second quasi-zero stiffness displacement range. As a result, both the first member and the second member may experience increased deflection (e.g., compression) with no or little additional force applied to the isolator and within the same range.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A vibration isolator comprising:
   a compressible inner member; and
   an outer member compressible with the inner member and comprising a lattice structure positioned at least partially around the inner member to provide lateral support to the inner member, the outer member maintaining a consistent diameter and compression force when in a compressed state.

2. The vibration isolator of claim 1, wherein the inner member comprises a plurality of conical disk springs stacked in an alternating configuration.

3. The vibration isolator of claim 2, further comprising a ring spacer positioned between two adjacent conical springs of the plurality of conical springs.

4. The vibration isolator of claim 1, wherein:
   the inner member has a first quasi-zero stiffness characteristic over a first displacement range; and
   the outer member has a second quasi-zero stiffness characteristic of a second displacement range overlapping at least partially with the first displacement range.

5. The vibration isolator of claim 1, wherein the outer member comprises a tube defined at least partially by the lattice structure, the inner member positioned within the tube to laterally support the inner member.

6. The vibration isolator of claim 5, wherein the lattice structure comprises a double-beam, bi-stable structure.

7. The vibration isolator of claim 1, wherein each of the inner member and the outer member comprises a bi-stable structure.

8. A system comprising:
   a first element;
   a second element; and
   the vibration isolator of claim 1 positioned between the first element and the second element to limit vibrations or shock forces imparted to the second element from the first element.

9. The system of claim 8, wherein the first element is a vehicle frame and wherein the second element is a vehicle seat.

10. A vibration isolator comprising:
    a first compressible member having a first quasi-zero stiffness characteristic over a first displacement range; and
    a second compressible member having a second quasi-zero stiffness characteristic over a second displacement range overlapping at least partially with the first displacement range, wherein the second compressible member comprises a lattice structure positioned around the first compressible member to provide lateral support to the first compressible member.

11. The vibration isolator of claim 10, wherein:
    the first compressible member comprises a spring assembly; and
    the second compressible member comprises an outer sleeve positioned around the spring assembly to provide lateral support to the spring assembly.

12. The vibration isolator of claim 11, wherein the spring assembly comprises a series of stacked conical springs.

13. The vibration isolator of claim 12, further comprising:
    an inner ring spacer positioned between a first pair of adjacent conical springs of the series of stacked conical springs; and
    an outer ring spacer positioned between a second pair of adjacent conical springs of the series of stacked conical springs.

14. The vibration isolator of claim 11, wherein the outer sleeve comprises a tube defined by the lattice structure, the spring assembly positioned within the tube.

15. The vibration isolator of claim 10, wherein the second compressible member has a Poisson's ratio of zero.

16. The vibration isolator of claim 10, wherein the second compressible member compresses with the first compressible member to limit relative motion between the first and second compressible members.

17. A method of limiting vibration or shock loads imparted to an object, the method comprising:
    positioning a quasi-zero stiffness vibration isolator between a first element and a second element, the quasi-zero stiffness vibration isolator comprising:
    a compressible first member; and
    a second member compressible with the first member and comprising a lattice structure positioned around the first member to provide lateral support to the first member.

18. The method of claim 17, further comprising maintaining a consistent diameter and compression force of the second member when the second member is in a compressed state.

19. The method of claim 18, further comprising maintaining a consistent compression force of the first member when the first member is in a second compressed state.

20. The method of claim 17, further comprising overlapping a first quasi-zero stiffness displacement range of the first member at least partially with a second quasi-zero stiffness displacement range of the second member.

* * * * *